United States Patent [19]

Helbers

[11] 4,086,637

[45] Apr. 25, 1978

[54] METHOD AND APPARATUS FOR LOADING FLEXIBLE MAGNETIC RECORDING DISCS TO TRANSDUCING HEADS

[75] Inventor: Jan Hendrik Helbers, Ann Arbor, Mich.

[73] Assignee: Sycor, Inc., Ann Arbor, Mich.

[21] Appl. No.: 668,409

[22] Filed: Mar. 19, 1976

Related U.S. Application Data

[62] Division of Ser. No. 529,489, Dec. 4, 1974, Pat. No. 3,975,774.

[51] Int. Cl.$^2$ .................. G11B 21/22; G11B 5/54; G11B 15/60
[52] U.S. Cl. ................................. 360/105; 360/130
[58] Field of Search .................... 360/99, 105, 130

[56] References Cited

U.S. PATENT DOCUMENTS

| 3,879,757 | 4/1975 | Elliott et al. ........................ 360/105 |
| 3,973,274 | 8/1976 | Morgan ................................ 360/99 |

Primary Examiner—Robert S. Tupper
Attorney, Agent, or Firm—Price, Heneveld, Huizenga & Cooper

[57] ABSTRACT

A flexible magnetic recording disc is brought into transducing relation with a recording head by moving a pressure pad against the disc from the side thereof opposite the recording head, and at a point upstream from the latter, in the direction of disc rotation. This resiliently flexes the disc and deviates part of it from its plane of revolution, causing it to partially wrap over the face of the head, in close transducing proximity, without the requirement of a pressure pad on the disc directly opposite the recording head, leaving that area open for other components. In a preferred embodiment, a separate transducing head is used on each side of the flexible disc, in direct alignment with one another, with a similarly-positioned pair of pressure pads disposed upstream, and all are mounted for articulating movement laterally toward and away from the plane of the disc. Means are provided to prevent simultaneous articulation of both such heads toward one another, to preclude crashing the heads against one another through the recording disc disposed therebetween.

8 Claims, 4 Drawing Figures

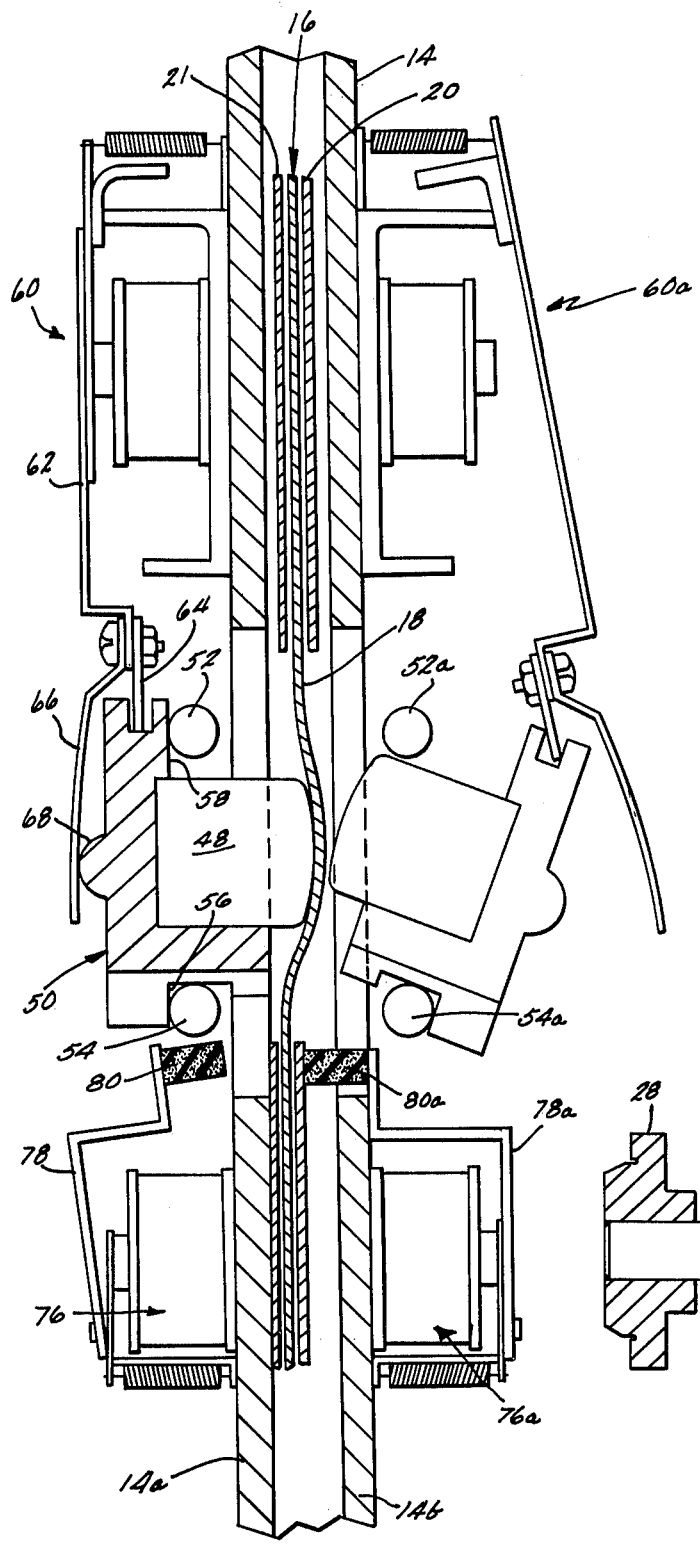
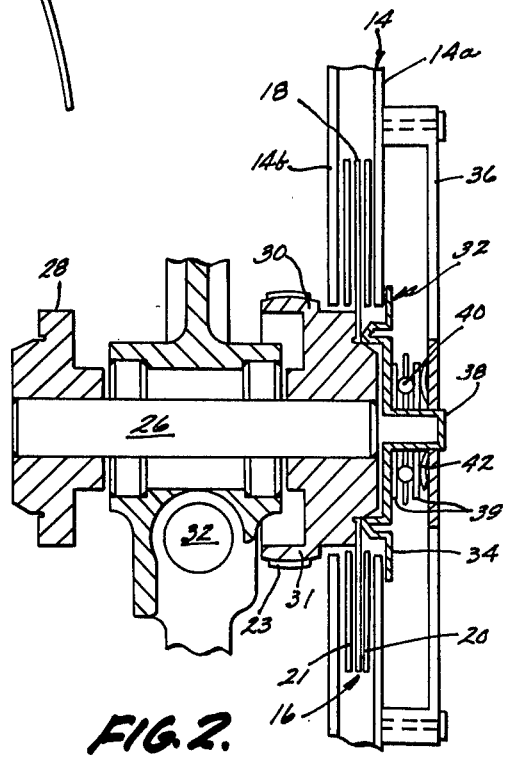
FIG. 3.
FIG. 2.

METHOD AND APPARATUS FOR LOADING FLEXIBLE MAGNETIC RECORDING DISCS TO TRANSDUCING HEADS

CROSS REFERENCE TO RELATED APPLICATION

This is a division of application Ser. No. 529,489, now U.S. Pat. No. 3,975,774 filed Dec. 4, 1974, entitled METHOD AND APPARATUS FOR LOADING FLEXIBLE MAGNETIC RECORDING DISC TO TRANSDUCING HEADS.

BACKGROUND OF THE INVENTION

Flexible disc magnetic recorders, although known in a general way for some time in the past, are more recently coming into much more prominent and frequent use, particularly in digital data storage applications.

The type of disc media most frequently encountered at this time is generally as shown in U.S. Pat. No. 3,668,658 and includes a thin, limply flexible magnetic recording disc generally having the characteristics of magnetic tape, which is permanently enclosed within a generally square (or rectangular) envelope, which is itself of flexible sheet plastic or the like, although being less flexible than the disc and, with the enclosed disc, making up an assembly that is self-supporting, or very nearly so.

The typical manner of using such disc assemblies is to restrain the corners of the rectangular disc enclosure or jacket and rotate the disc within its enclosing jacket, by engaging the center part of the disc, which is exposed through an opening in the side of the jacket. The jacket, or envelope, also defines a radial opening through which the recording disc is exposed, for access by the recording head, which by traversing the disc radially while it is rotated may thus address the same at any point on its surface.

The proper transducing relationship of the recording head to the disc has been the subject of considerable investigation and effort, and certain of the considerations involved are shown in U.S. Pat. No. 3,688,285, which shows a typical transducing relationship, in which the head actually protrudes into the plane of the disc when the same is rotated, thereby creating a moving dimple-like elastic deformation under such conditions. Typically, the extremely close, intimate proximity required for proper transducing operation (believed by some to be an air film on the order of a few microinches thick, while regarded by others as being direct sliding contact) is maintained, at least for the jacketed type of disc referred to above, by pressure pads; most usually, a felt or other such cushioning pad which is located directly on the opposite side of the disc from the transducing head, and which in effect presses the disc against the head. Such a practice, while regarded by many as being essential to proper recording operation, does severly limit the operational flexibility of recorders designed to operate with such discs, since the oppositely-disposed transducing head and pressure pad essentially use all of the allowable access area to the disc which is provided by the jacket. Consequently, such recorders typically have allowed for recording only on one side of the disc, even though commercial discs are manufactured with the capability of recording on each side. In present equipment, however, such recording can be accomplished only by physically withdrawing and reversing the disc assembly.

Accordingly, recorders manufactured and used heretofore have not taken full advantage of the operational flexibility or usefulness made possible by the disc assemblies themselves; furthermore, achieving and maintaining proper transducing relationship of the head to the disc has been a source of constant experimentation and change, believed in large part to result from operation which is basically unsatisfactory in nature.

SUMMARY OF THE INVENTION

The present invention provides an improvement in recorder apparatus using flexible disc assemblies of the type described, in which a new and different arrangement of transducer heads and pressure pads is utilized to provide a new and different form of head-to-disc loading, i.e., proximity, and in particular, transducing proximity, such term being used herein to denote generally the desired intimately close operative relationship between the head and the flexible recording disc, regardless of whether the same be characterized by an infinitesimal air gap or by direct contact. Further, the invention provides a new physical apparatus implementing the recording head and pressure member organization which makes possible new operational modes for such a recorder and not realized by previous equipment, as well as greatly augmented operational flexibility for such devices.

Summarily stated, the invention provides a recorder/reproducer device for flexible disc assemblies which has a drive hub or the like for rotating the disc in a basically flat plane of revolution, with a transducing head projecting into such plane from one side of the disc, and with a means for constraining at least a portion of the disc laterally toward the transducing head from the opposite side of the disc, including means for exerting pressure on the disc from the opposite side at a location in the upstream direction from the head relative to the rotation of the disc, thereby leaving the area of the disc on the side thereof directly opposite the transducing head substantially unoccupied and unobstructed by pressure-exerting structure, such as pressure pads and the like. The pressure exerted upon the disc upstream from the head forces the disc into transducing proximity with the head at its downstream position, without the strict requirement of a pressure pad directly opposite the head, on the other side of the disc, to push the disc directly toward and against the head. This allows a second transducing head to be positioned directly opposite the first, on the opposite side of the disc, for recording on such side without having to physically withdraw the recording disc and invert the same, as is conventionally the case. In accordance with the invention, the recording heads may be, and preferably are, mounted for articulation or movement toward and away from the plane of the recording disc, and the same is true with respect to the upsteam pressure members.

BRIEF DESCRIPTION OF THE DRAWINGS

FIG. 2 is a fragmentary, sectional elevational view taken through the plane II—II of FIG. 1;

FIG. 3 is an enlarged, fragmentary sectional elevation taken through the plane III—III of FIG. 1, showing the mutual engagement of recording head and disc.

DESCRIPTION OF THE PREFERRED EMBODIMENT

Figure 1:
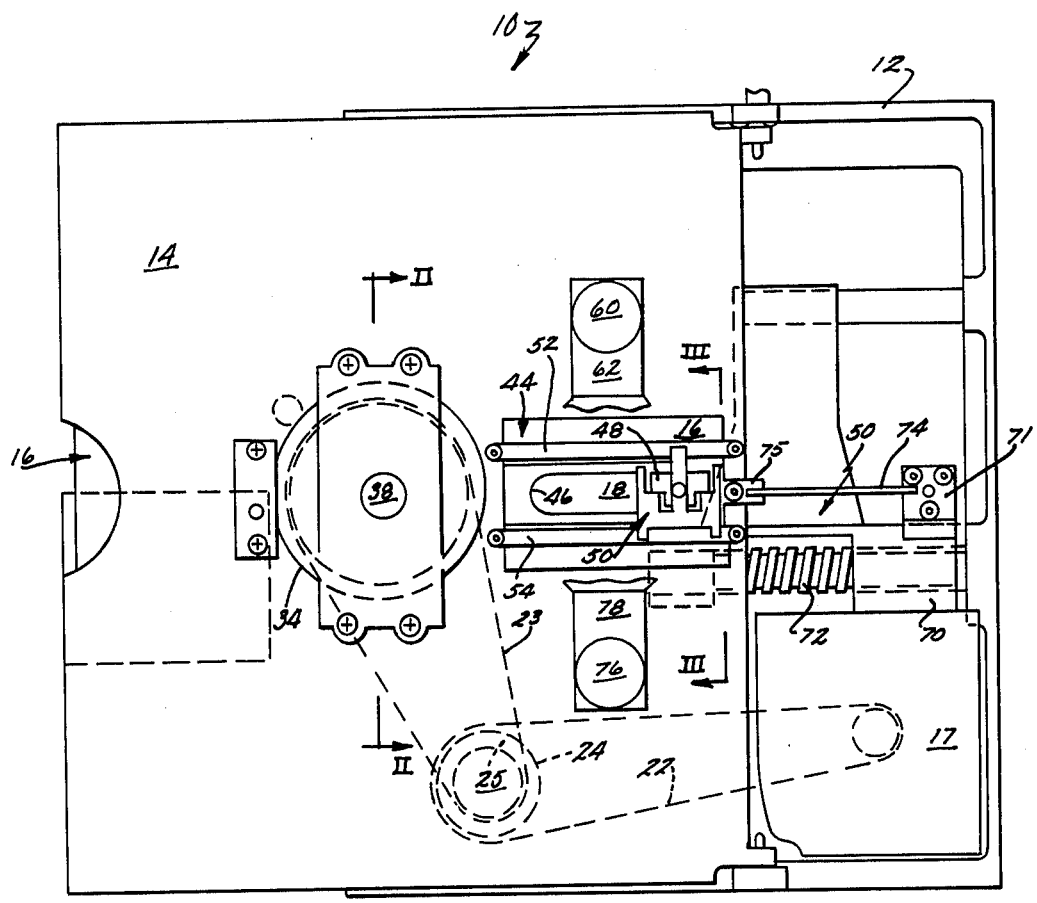
FIG. 1 is a side elevational view of a recorder/reproducer device embodying the invention.

The claimed invention is described herein with reference to various elements and parts of a particular recorder/reproducer apparatus, as part of the environment and to facilitate and expedite an understanding of the invention in relation to a complete device; however, for a more complete description of the overall nature of such apparatus, reference is made to copending application Ser. No. 418,299, now U.S. Pat. No. 3,913,137; assigned to the assignee of the instant patent, which for this purpose may be considered incorporated by reference.

The recorder/reproducer apparatus 10 illustrated in the different drawings includes a main frame 12, to the side of which is pivotally mounted a door-like disc-receiver 14 which in effect comprises a pair of side plates 14a and 14b (FIGS. 2 and 3) joined together to define a narrow space therebetween, which receives a disc assembly 16 of the type identified previously herein, i.e., comprising a thin, limply flexible magnetic recording disc 18 which is enclosed within a jacket-like envelope comprising a pair of rectangular side sheets 20, 21 which are joined at their margins. The recorder apparatus 10 has a drive motor 17 which, through appropriate belts 22 and 23 (FIG. 1) and drive pulleys 24, 25 rotatably drives a shaft 26 (FIG. 2) having one or more drive hubs 28, 30 which operate to rotatably drive the flexible disc 18, whose central portion is clamped in place against such hubs by suitable clamping apparatus 32. As illustrated, drive hub 20 may have an inner hub portion 31 about which belt 23 is entrained to drive the hub and, by mechanical interconnections, drive shaft 26 and hub 28.

The clamping apparatus 32 may generally comprise a clamping hub or idler 34 (FIG. 2) which may be of molded polymeric material having a relatively high coefficient of friction, which is forced into an enlarged opening in the side of disc receiver 14 by a C-shaped clamping bracket 36 which has a central aperture for receiving an outwardly projecting shank 38 which may be integral with hub 34, shank 38 carrying a pair of flat washers 38 which act as bearing races, flanking a bearing 40 on either side. A wave-shaped spring washer 42 operates to spring-load the bearing and washers, and thus the hub 34, laterally away from mounting bracket 36. The door-like disc-receiver 14 fits upon the frame 12 such that hub 34 is placed in tight engagement against the recording disc 18 and drive hub 30, but floats with respect to the outer surface of the receiver 14, which moves inwardly the required distance.

Thus, the flexible recording disc 18 is clamped against drive hub 30 very tightly, and upon rotation of the drive hub, the disc will be similarly rotated, thereby establishing a plane of revolution within its enveloping jacket 20, 21, which is restrained in place within receiver 14, whose interior may have a square or rectangular shape complementary to and closely fitting that of the disc jacket. The disc receiver 14 has an elongated, somewhat rectangular opening 44 therein (FIG. 1), the axis of which falls generally along a radius of the recording disc within the receiver. Opening 44 provides access to the disc assembly 16 and, more particularly, to an elongated opening 46 in the side of the disc jacket 20, 21, which directly exposes the recording disc 18 for access by the transducing head 48, which reciprocates laterally across the receiver door opening by riding upon a head carrier 50 on which it is mounted.

The rectangular opening 44 in the disc-receiver has a pair of spaced, parallel guide rods 52, 54 (FIG. 1) mounted across it, in a manner which provides three spaced, rectangular openings above, between and below the guide rods. More particularly, the rectangular opening in the disc receiver extends through both side portions 14a, 14b thereof (FIG. 3), and guide rods 52, 54 may have counterparts 52a, 54a mounted on the inside plate portion of each disc-receiver. The guide rods provide accurate referencing relative to the disc-receivers on which they are mounted and, furthermore, each guide rod provides a slidable support for one of the head-carriers 50, upon which a magnetic head 48 is rigidly supported. Each of the head carriers 50 has a rectangular guideway in its underside which fits over the lower guide bar 54, and also includes a flat vertical surface 56 which bears flush against the side of guide rod 54. Similarly, the top portion of the carrier block 50 has a flat vertical guide surface 58 which bears flush against the side of the upper guide rod 52. These surfaces provide reference positions and are very important to successful recording and reproducing operation, inasmuch as they establish the depth of penetration of the curved face of head 48 into the plane of flexible disc 18, and it is now generally known that the parameters of such penetration, (i.e., depth and angle of head) are very important factors in obtaining the best recording on a flexible disc. In this respect, it should here be noted that, as illustrated in FIG. 3, although the face of the recording head protrudes into the plane of the disc, the particular extent and nature of such protrusion and penetration is not a focal point of this invention; thus, terms used herein such as "penetration", "contact", "proximate engagement" or the like, of the head to the disc, are not used in a critical sense and are to be construed very generally.

As so positioned upon the guide rods 52, 54, head carrier 50 is thus articulated, or rockable, upon the lower guide bar 54, toward and away from (i.e., "angularly" with respect to) the disc-receiver and the disc positioned within the latter; at the same time, the head carrier is slidable along the guide rods, both when tilted toward and away from the recording disc.

The tilting or rocking movement of the head carrier is caused by operation of a solenoid 60 mounted above the latter and responsive to energization by moving a control arm 62 inwardly and outwardly with respect to the disc-receiver. Attached to the lower extremity of control arm 62 (or integral therewith) is a first actuator portion 64 comprising an elongated stiffly resilient flap-like element loosely disposed within a rectangular notch or guideway in the top of the head carrier block 50. Also attached to the lower end of control arm 62 is a second actuator 66, comprising a resiliently flexible sheet metal or like spring member which bears against a round protrusion 68 on the outer or rear side of the head carrier. Thus, when the solenoid pulls in upon being energized, the more rigid actuator 64 will operate to move the carrier block into generally vertical position, nearing contact with both guide rods, but the resilient actuator 66 will push directly against protrusion 68 and spring-load the carrier block against both upper and lower guide bars, thereby bringing the head 48 into referenced transducing position. Conversely, when the solenoid is de-energized, outward excursion of the control arm 62 will move the spring actuator 66 away from the back of carrier block 50 and, at the same time, move the first actuator 64 within the slot at the top of the carrier block and against the upper portion thereof, tipping the carrier block back into the position shown at the right in FIG. 3, in which the head is fully out of transducing relation with the disc.

Each of the disc-receivers 14 may if desired carry two transducing heads, each mounted on a separate carrier block 50 supported on its own guide rods, with separate actuating solenoids for each. Thus, each disc may be recorded on either side, to give selectable two-way recording or reproducing operation (or four-way if two receivers and two discs are used, one on each side of frame 12). Of course, fewer numbers of recording heads may also be used, for example, only one on each disc-receiver, in which case the discs may be physically reversed to provide for opposite-side recording, while realizing certain economies by the elimination of two complete recording heads and all of the associated mechanical and electronic components.

In any event, the head carriers and the transducing heads mounted thereon are subjected to sliding movement upon guide rods 52 and 54, thereby imparting translational or traversing movement to the transducing heads radially across the face of the recording discs, i.e., in either lateral direction within the elongated radial slot 46 in the disc envelope. This translational movement is obtained by coupling the head carriers 50 to a translator or follower 70 (FIG. 1) which is threadably mounted on a lead screw or worm 72 rotatably driven in any desired manner, as by a stepper motor. That is, the follower 70 has an upstanding leg portion 71, disposed generally in the plane of the disc-receiver, and to each opposite side of these upstanding leg portions is secured one end of a stiffly flexible head-positioning arm 74, which may be of stainless steel music wire or the like. The opposite ends of the head arms 74 are attached to a laterally-extending tab portion 75 forming a part of the head carrier 50 (FIG. 1).

In this manner, the head carrier, and thus the recording head itself, is positioned on the guide bars with requisite accuracy relative to the motion translator or follower 70, and thus to the worm 72 as well, since the length of the head arm 74 serves as an indexing tool. Of course, the rigidity of the head arm allows it to push or pull the attached head-carrier across its respective disc. At the same time, the torsional flexibility of the head arm allows the head carrier and its respective recording head to be free for the limited movement required in tilting or rocking the head upon the guide bars, into and out of transducing position, while, at the same time, freely tracking across the face of the disc as a result of movement by the translator 70 in response to stepped rotation of the lead screw or worm 72.

In order to assure proper transducing proximity of the transducing head with the flexible disc 18, it is conventional practice to utilize a pressure pad to force the disc toward and against the transducing head. In the past, a wide variety of different types of pads have been used for this purpose, but usually a felt or like pad is disposed directly opposite the transducing head, on the opposite side of the disc, as is often done in tape recorders, to in effect squeeze the recording media therebetween. A different approach is used in the present invention, as illustrated in FIG. 3. Basically, a second solenoid 76 is mounted below the lower guide bar 54, with an upstanding control arm 78 which carries a pressure pad 80 at the top thereof, made of elastomeric foam or the like. Pressure pad 80 is generally coextensive with the lower part of rectangular opening 44 beneath guide bar 54, but is sufficiently smaller than the opening to fit through it when control arm 78 is moved accordingly, upon energization of solenoid 76. Thus, when the head carrier 50 on one side of a recording disc is moved into transducing position, the pressure pad 80 (or 80a) on the opposite side of that disc is moved into position by actuation of its controlling solenoid. When so actuated, the pressure pad moves into the opening 44 in the side of the disc-receiver and against the side 20 of the flexible disc envelope, squeezing the entire disc assembly against the opposite interior face of disc-receiver plate 14a. In this position, when the flexible disc 18 is rotated, it actually forms a traveling, dimple-like deformation around the curving face of the transducer head, as illustrated, it being understood that the direction of motion of the disc is from the pressure pad toward the transducing head, i.e., the pressure pad is upstream from the head relative to the direction of disc rotation. In this manner, the required relationship is established between the flexible disc and the face of the recording head for proper transducing operation, even though there is no backup pressure pad whatever disposed directly opposite, in alignment with, the face of the transducing head.

In accordance with the foregoing, it will thus be seen that the pressure means used in the present invention to obtain the desired disc-to-head proximity is greatly different than the typical small, localized pad which presses the disc directly against the head, being an elongated device disposed generally parallel to the nominal plane of revolution of the magnetic disc (which is basically the plane occupied by the disc in FIG. 2), and is actually moved into or through such plane upon actuation while, at the same time, the recording head on the opposite side of the disc receiver is similarly moved, so as to extend into the plane of disc rotation. If a recording head is to be provided on both of the opposite sides of the disc receiver, two pressure pad assemblies will also be provided, and the head and pressure pad on opposite sides of the disc receiver will be actuated correspondingly; however, it may not be necessary in all cases to provide recording heads and pressure pad assemblies which are both movably mounted, particularly where only one recording head is to be used, since in such instances it will usually be enough to make only one pad or head in a given operational pair of the same be movable. Of course, the particular manner in which such component is mounted for movement is subject to numerous possible variations, even to the extent of mounting the same on structures other than the receiver, so long as the effective result is the same.

Although an operable electrical circuit for merely energizing the particular desired solenoids in the group 60, 60a and 76, 76a, for selective actuation of the desired recording head and/or pressure pad into transducing relationship, is clearly of so simple a nature as to require no specific disclosure, it should nonetheless be pointed out that if the multiple installation of FIG. 3 is used, with recording heads and pressure pads mounted on both sides of the disc receiver, measures should be taken to ensure that not only are the selected components properly actuated but, in addition, the non-selected components are disabled or positively prevented from actuation. This is important not only with respect to the pressure pads, improper actuation of which would in all probability result in the loss of proper head-to-disc transducing proximity, but is even more important with respect to the recording heads themselves, inasmuch as if both are inadvertantly actuated, they will "crash", i.e., they will collide with one another through the interposed disc, thereby in all likelihood severely damaging the disc, and probably the heads as well and surely preventing proper transducing operation.

Figure 4:
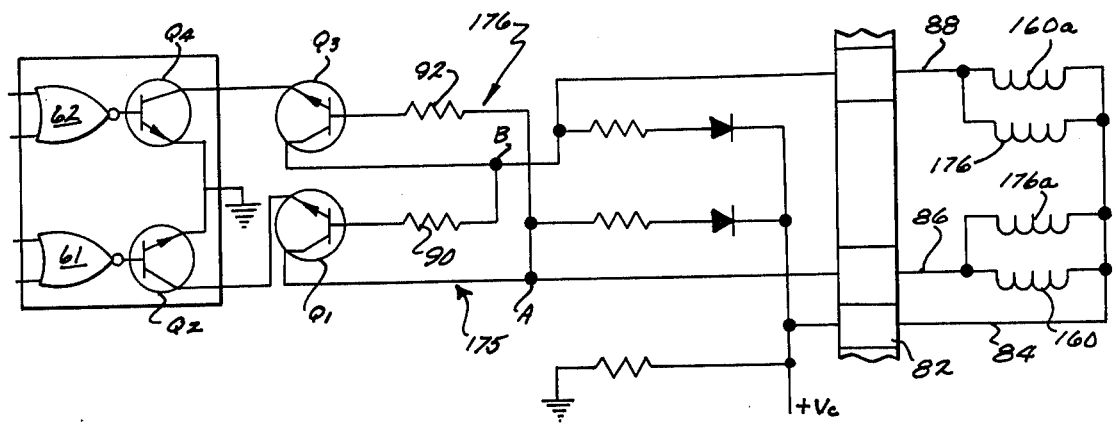
FIG. 4 is a schematic circuit diagram illustrating actuation of the recording heads and pressure members, for articulation thereof.

A preferred control circuit for accomplishing the aforementioned end is illustrated in FIG. 4, and will be seen to comprise, in addition to the solenoid windings 160, 176a, 176 and 160a (corresponding to solenoids 60, 76a, 76 and 60a, (respectively), the following circuit branches and components. A first circuit branch 175 including transistors Q1 and Q2 is coupled through an appropriate plug or other connector 82 to solenoid windings 160 and 176a, which are connected together in parallel for simultaneous excitation. The same type of parallel connection is true for the other two solenoid windings, and all such windings are coupled to positive operating potential Vc through connector 82, as by a conductor 84. Thus, it will be seen that a conductor 86 connects windings 160 and 176a to the collector of transistor Q1, the emitter of which is connected directly to the collector of transistor Q2, whose emitter, in turn, is connected to ground at circuit point "C". The base of transistor Q2 is connected to a switching gate G1 which, as illustrated, may be a Nand gate having a pair of input terminals for appropriate selective triggering.

A second operating circuit 176, containing transistors Q3 and Q4, and another Nand gate G2, is configured similarly to circuit branch 175, and is connected, as by a connector 88, to solenoid windings 160a and 176.

It may be noted that the base of transistor Q1 is connected, through a resistor 90, to the collector of transistor Q3, in the opposite actuating circuit, as well as to the supply voltage $V_c$ through the solenoid windings. Conversely, the base of transistor Q3 is coupled, through a resistor 92, to the collector of transistor Q1, as well as to the supply voltage and the solenoid windings.

With the circuit arrangement just described, it may be seen that, generally speaking, a triggering pulse input to gate G1, for example, will switch transistor Q2 to a conducting state, thus connecting the emitter of transistor Q1 to ground and completing a path for energizing solenoid windings 160 and 176a. In so doing, the potential at circuit point A is suddenly lowered very substantially, thereby dropping the potential on the base of transistor Q3 the same amount and holding this transistor at cut-off, positively locking out solenoids 60a and 76 by preventing their windings 160a and 176 from being energized. Of course, the absence of enabling excitation from gate G1 causes the circuit to restore to its steady state condition, and the presence of enabling excitation at gate G2 causes the opposite effect, i.e., energization of windings 160a and 176 with attendant blocking-out of winding 160 and 176a.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are described as follows.

1. In a recorder/reproducer device using a thin, flexible magnetic disc as the recording media, the improvement comprising: a pair of magnetic heads for recording or reproducing operation on opposite sides of said disc, and means mounting said heads on opposite sides of said disc; means for moving said disc and a selected one of the heads in said pair thereof relative to and independently of the other head in said pair, to bring the disc and the selected one head closely adjacent one another and into transducing relation; said means for moving including a selectively operable actuator means for each of said heads producing movement of that head; and means for controlling said means for moving to preclude operation of the actuator means which would produce movement to bring the disc and said other head into transducing relation at the same time as the disc and said selected one head are in said transducing relation.

2. The improvement of claim 1, wherein said means mounting said heads on opposite sides of the disc mounts both of said for reciprocatory movement generally toward and away from the plane of said disc, and said means for moving includes first and second mutually independent remotely controllable actuators each connected to a different one of said heads for imparting such movement independently to either such head.

3. The improvement of claim 1, wherein said means for controlling includes an electrical circuit means for selectively remotely controlling said actuator means.

4. The improvement of claim 2, wherein said electrical circuit means selectively controls said actuators by electrically enabling a selected one thereof while inhibiting the other.

5. The improvement of claim 1, wherein said heads are mounted in direct alignment with one another on opposite sides of said disc and are mounted for relative movement toward one another.

6. The improvement of claim 5, including pusher means on each opposite side of said disc for moving the disc toward the other such pusher means.

7. The improvement of claim 6, wherein said means for moving is operable to move a selected one of said heads and to actuate a first one of said pusher means located on the side of the disc opposite said selected one of said heads, and to do so at substantially the same time.

8. The improvement of claim 7, wherein said means for moving is further operable to move the other of said heads and to actuate the other of said pusher means at substantially the same time in an alternate manner and at mutually exclusive times with respect to the said selected one head and first one of said pusher means.

* * * * *

UNITED STATES PATENT AND TRADEMARK OFFICE
CERTIFICATE OF CORRECTION

PATENT NO. : 4,086,637
DATED : April 25, 1978
INVENTOR(S) : Jan Hendrik Helbers

It is certified that error appears in the above-identified patent and that said Letters Patent are hereby corrected as shown below:

Column 8, line 29:

"of said for" should be --- of said heads for ---.

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*